US009167468B2

(12) United States Patent
Guo

(10) Patent No.: US 9,167,468 B2
(45) Date of Patent: Oct. 20, 2015

(54) METHOD AND DEVICE FOR CHANNEL ESTIMATION

(75) Inventor: Yang Guo, Shenzhen (CN)

(73) Assignee: ZTE CORPORATION, Hi-Tech Industrial Park, Nanshan, Shenzhen, Guangdong (CN)

( * ) Notice: Subject to any disclaimer, the term of this patent is extended or adjusted under 35 U.S.C. 154(b) by 113 days.

(21) Appl. No.: 14/237,867

(22) PCT Filed: Oct. 18, 2011

(86) PCT No.: PCT/CN2011/080931
§ 371 (c)(1),
(2), (4) Date: Feb. 7, 2014

(87) PCT Pub. No.: WO2013/023405
PCT Pub. Date: Feb. 21, 2013

(65) Prior Publication Data
US 2014/0185486 A1 Jul. 3, 2014

(30) Foreign Application Priority Data
Aug. 12, 2011 (CN) .......................... 2011 1 0231538

(51) Int. Cl.
H04W 4/00 (2009.01)
H04W 24/10 (2009.01)
(Continued)

(52) U.S. Cl.
CPC ............ *H04W 24/10* (2013.01); *H04L 5/0035* (2013.01); *H04L 25/0202* (2013.01); *H04L 25/0204* (2013.01); *H04L 25/0224* (2013.01); *H04L 25/0228* (2013.01); *H04W 72/00* (2013.01)

(58) Field of Classification Search
None
See application file for complete search history.

(56) References Cited

U.S. PATENT DOCUMENTS

2009/0046582 A1* 2/2009 Sarkar et al. ................ 370/230.1
2009/0147875 A1* 6/2009 Akita et al. .................... 375/260
(Continued)

FOREIGN PATENT DOCUMENTS

CN 101304275 A 11/2008

OTHER PUBLICATIONS

Hou, Xueying et al., Joint channel estimation for downlink base station cooperative transmission exploiting channel asymmetry, Aug. 25, 2010, See Supplementary European Search Report.
(Continued)

*Primary Examiner* — Otis L Thompson, Jr.
(74) *Attorney, Agent, or Firm* — Oppedahl Patent Law Firm, LLC

(57) ABSTRACT

The disclosure provides a method for channel estimation, including that: a small-scale fading channel of each carrier of each interfering channel is obtained respectively according to a Gaussian distribution; a total interfering power $P_I$ of all interfering SRSs is calculated according to the obtained small-scale fading channel of each carrier of each interfering channel and a generated large-scale fading gain of each carrier of each interfering channel; interference-equivalent noise $N_I$ is calculated according to the total interfering power $P_I$; and channel estimation is performed according to a Sounding Reference Signal (SRS) Y received by an Evolved Node B (eNB), wherein Y is calculated with a formula $Y=SH+N_I+N_0$. The disclosure further provides a device for channel estimation. With the disclosure, it is not required to generate small-scale fading of an interfering channel, reducing complexity of, and thereby improving efficiency in, simulation.

13 Claims, 10 Drawing Sheets

(51) Int. Cl.
*H04L 25/02* (2006.01)
*H04L 5/00* (2006.01)
*H04W 72/00* (2009.01)

(56) References Cited

U.S. PATENT DOCUMENTS

| | | | |
|---|---|---|---|
| 2009/0196370 A1* | 8/2009 | Cheng et al. | 375/267 |
| 2010/0142466 A1* | 6/2010 | Palanki et al. | 370/329 |
| 2011/0098054 A1* | 4/2011 | Gorokhov et al. | 455/452.1 |
| 2012/0113967 A1* | 5/2012 | Smith et al. | 370/338 |

OTHER PUBLICATIONS

Paulraj A J et al., Space time processing for wireless communications, Nov. 11, 1997, See Supplementary European Search Report.
Kuo, Wen-Yi, Analytic forward Link performance of Pilot Aided Coherent DS-CDMA Under Correlated Rician Fading, Jul. 1, 2000, See Supplementary European Search Report.
3GPP TSG RAN WG1 #63, UTDOA Performance with SRS Interference Cancellation, Alcatel-Lucent, Jacksonville, FL, USA, Nov. 9, 2010, See Supplementary European Search Report.
Lee Seung-Hwan et al., A Simple Channel Model for Investigation of Multiuser Scheduling in MIMO Broadcast Channels, May 11, 2008, See Supplementary European Search Report.
Supplementary European Search Report in European application No. 11870968.2, mailed on Dec. 22, 2014.
International Search Report in international application No. PCT/CN2011/080931, mailed on May 17, 2012.
English Translation of the Written Opinion of the International Search Authority in international application No. PCT/CN2011/080931, mailed on May 17, 2012.
Lv, Qian, Design and implementation of sounding reference signal in LTE, English abstract on pp. 6-7, Aug. 9, 2011, see See International Search Authority documents for relevance.

* cited by examiner

METHOD AND DEVICE FOR CHANNEL ESTIMATION

TECHNICAL FIELD

The disclosure relates to Long Term Evolution (LTE) technology in wireless communications, and in particular to a method and a device for channel estimation.

BACKGROUND

In an LTE system, a Sounding Reference Signal (SRS) is a signal for measuring wireless channel information between a User Equipment (UE) and an Evolved Node B (eNB).

In the LTE system, an SRS sequence $r_{u,v}^{(\alpha)}(n)$ (wherein, $\alpha$ is an integer between 0 and 7) is obtained by performing cyclic shift on a basic sequence $\overline{r_{u,v}}(n)$ (wherein u represents a group number of a sequence, v represents a sequence number within a group, and n represents the n-th symbol of a pilot sequence), and is subjected to physical resource mapping to obtain the SRS. SRSs obtained by performing cyclic shift on different basic sequences are not orthogonal to each other, but are correlated with each other. Namely, there is interference among the SRSs. However, SRSs obtained by performing cyclic shift on the same basic sequence are orthogonal to each other, and are uncorrelated with each other. Namely, there is no interference among same-frequency SRSs.

A UE transmits a target SRS to an eNB corresponding to the UE regularly according to parameters configured for the eNB, such as a bandwidth, a location in a frequency domain and a period. an SRS transmitted by the UE will arrive at both the eNB corresponding to the UE and an eNB other than the UE-corresponding eNB. An SRS arriving at the eNB corresponding to the UE is referred to as a target SRS, while an SRS arriving at an eNB other than the UE-corresponding eNB is referred to as an interfering SRS. The eNB performs channel estimation to obtain channel information according to the received target SRS, and further performs operations such as frequency-domain selective scheduling, close-loop power control, or pre-coding according to the obtained channel information.

However, basic sequences of SRSs transmitted by UEs in different cells are generally different, so a target SRS transmitted by a UE to an eNB corresponding to the UE may be subject to interference by another SRS, i.e., adjacent-cell same-frequency interference.

FIG. 1 is a schematic diagram showing interference with a target SRS from a target UE by a same-frequency interfering SRS from an adjacent cell in an LTE system. As shown in FIG. 1, cell 1 has two adjacent cells, i.e., cell 2 and cell 3. A target UE0 transmits a first target SRS to an eNB in cell 1, a first interfering UE1 transmits an eNB in the cell 2 a second target SRS forming a first interfering SRS of the first target SRS, and a second interfering UE2 transmits an eNB in the cell 3 a third target SRS forming a second interfering SRS of the first target SRS. The eNB in the cell 1 receives the first target SRS, the first interfering SRS and the second interfering SRS simultaneously. The first interfering SRS and the second interfering SRS may interfere with the first target SRS. It thereby can be seen that the target SRS is a valid signal transmitted by the target UE to the eNB corresponding to the target UE; and the interfering SRSs are interfering signals transmitted to the same eNB by interfering UEs in adjacent cells.

At present, with LTE, adjacent-cell same-frequency interference can be controlled and coordinated using methods such as scheduling, power control, Inter Cell Interference Coordination (ICIC), or the like. However, the aforementioned methods cannot eliminate adjacent-cell same-frequency interference completely, so the target SRS transmitted by the target UE is still subjected to interference by a same-frequency interfering SRS from an adjacent cell.

Now, the 3rd Generation Partnership Project (3GPP) organization needs to evaluate performance of an LTE system in a non-ideal state. Thus, it is required to simulate a target SRS received by an eNB, which target SRS is subjected to interference by an interfering SRS; and channel estimation is performed according to an SRS obtained by processing the target SRS to complete the performance evaluation.

In an existing simulation, an SRS Y received by an eNB is obtained according to a formula $$Y = SH + \sum_{k=1}^{K} S_{I_k} H_{I_k} + N_0,$$

wherein S represents a target SRS transmitted by a target UE; H represents a target channel carrying the target SRS; k represents a sequence number of an interfering UE, $k \in \{1, 2, \ldots, K\}$; $S_{I_k}$ represents an interfering SRS sequence transmitted by a k-th interfering UE; $H_{I_k}$ represents an interfering channel carrying the interfering SRS transmitted by the k-th interfering UE; $N_0$ represents channel noise; and $$\sum_{k=1}^{K} S_{I_k} H_{I_k}$$

represents the received interfering SRS.

At present, the target channel and an interfering channel in the formula need to be generated according to a channel-generating process of a Spatial Channel Model (SCM) in the 3GPP. Generating an interfering channel includes generating a large-scale fading gain and a small-scale fading channel. However, due to effect of factors such as multipath, angle spread, time delay and the like, the generation of a small-scale fading channel is quite complicated and time-consuming.

SUMMARY

In view of the above, it is desired that embodiments of the disclosure provide a method and a device for channel estimation, which avoid generating small-scale fading of an interfering channel, reducing complexity of, and thereby improving efficiency in, simulation.

To this end, a technical solution of the disclosure is implemented as follows.

The disclosure provides a method for channel estimation, including:

obtaining a small-scale fading channel of each carrier of each interfering channel respectively according to a Gaussian distribution;

calculating a total interfering power $P_I$ of all interfering SRSs according to the obtained small-scale fading channel of each carrier of each interfering channel and a generated large-scale fading gain of each carrier of each interfering channel;

calculating an interference-equivalent noise $N_I$ according to the total interfering power $P_I$; and performing channel estimation according to a Sounding Reference Signal (SRS) Y received by an Evolved Node B (eNB), the SRS Y being taken as the sum of the interference-equivalent noise $N_I$, a product SH, and a channel noise $N_0$, wherein S represents a target SRS transmitted by a target User Equipment (UE), and H represents a target channel carrying the target SRS.

In an embodiment, the Gaussian distribution may be CN (0,1).

In an embodiment, the step of calculating a total interfering power $P_I$ of all interfering SRSs may include:

generating a channel of each carrier of each interfering channel by multiplying the obtained small-scale fading channel of each carrier of each interfering channel by the generated large-scale fading gain of each carrier of each interfering channel respectively;

calculating a power $$P_{H_{I_k}}$$

of each interfering channel by summing over the respective square of a gain of each carrier of each interfering channel; and calculating the total interfering power $P_I$ of all interfering SRSs by summing over the respective product of a transmit power $$P_{S_{I_k}}$$

of each interfering SRS on each carrier times the power $$P_{H_{I_k}}$$

of an interfering channel corresponding to each carrier.

In an embodiment, the step of calculating a total interfering power $P_I$ of all interfering SRSs may specifically include:

generating a channel of each carrier of each interfering channel by multiplying the obtained small-scale fading channel of each carrier of each interfering channel by the generated large-scale fading gain of each carrier of each interfering channel respectively;

generating each equivalent interfering channel $H_{I_k}'$ according to the channel of each carrier of each interfering channel; and calculating the total interfering power $P_I$ of all interfering SRSs by respectively multiplying each interfering SRS $S_{I_k}$ by an equivalent interfering channel $H_{I_k}'$ corresponding to the interfering SRS to obtain a first product $S_{I_k}H_{I_k}'$, and then summing over a respective product of each first product $S_{I_k}H_{I_k}'$ times the conjugate of the each first product $S_{I_k}H_{I_k}'$.

In an embodiment, the step of calculating an interference-equivalent noise $N_I$ according to the total interfering power $P_I$ may specifically include:

taking the total interfering power $P_I$ as a noise power $\sigma_I^2$; and calculating the interference-equivalent noise $N_I$ according to a Gaussian distribution CN $(0, \sigma_I^2)$.

In an embodiment, the method may further include: before the taking the total interfering power $P_I$ as a noise power $\sigma_I^2$, generating each equivalent interfering channel $H_{I_k}'$ according to the channel of each carrier of each interfering channel; and calculating a total interfering-power increment $P_{S,S_I}$ caused by correlation at the eNB between the target SRS and each interfering SRS by multiplying the target SRS S by the target channel H to obtain SH, respectively multiplying each interfering SRS $S_{I_k}$ by an equivalent interfering channel $H_{I_k}'$ corresponding to the interfering SRS to obtain a first product $S_{I_k}H_{I_k}'$, and summing over a respective product of the conjugate of the SH times each first product $S_{I_k}H_{I_k}'$, wherein the step of taking the total interfering power $P_I$ as a noise power $\sigma_I^2$ may specifically include: taking the sum of the total interfering power $P_I$ and the total interfering-power increment $P_{S,S_I}$ caused by correlation at the eNB between the target SRS and each interfering SRS as the noise power $\sigma_I^2$.

In an embodiment, the method may further include: after generating each equivalent interfering channel $H_{I_k}'$ according to the channel of each carrier of each interfering channel, calculating a total interfering-power increment $P_{S_I,S_{I'}}$ caused by pair-wise correlation at the eNB between each interfering SRS and another interfering SRS by respectively multiplying each interfering SRS $S_{I_k}$ by the equivalent interfering channel $H_{I_k}'$ corresponding to the interfering SRS to obtain a first product $S_{I_k}H_{I_k}'$, and summing over a respective product of the conjugate of each first product $S_{I_k}H_{I_k}'$ times another first product, wherein the step of taking the total interfering power $P_I$ as a noise power $\sigma_I^2$ may specifically include: taking the sum of the total interfering power $P_I$, the total interfering-power increment $P_{S,S_I}$ caused by correlation at the eNB between the target SRS and each interfering SRS, and the total interfering-power increment $P_{S_I,S_{I'}}$ caused by pair-wise correlation at the eNB between each interfering SRS and another interfering SRS as the noise power $\sigma_I^2$.

In an embodiment, the method may further include: before the taking the total interfering power $P_I$ as a noise power $\sigma_I^2$, generating each equivalent interfering channel $H_{I_k}'$ according to the channel of each carrier of each interfering channel; and calculating a total interfering-power increment $P_{S_I,S_{I'}}$ caused by pair-wise correlation at the eNB between each interfering SRS and another interfering SRS by respectively multiplying each interfering SRS $S_{I_k}$ by the equivalent interfering channel $H_{I_k}'$ corresponding to the interfering SRS to obtain a first product $S_{I_k}H_{I_k}'$, and summing over a respective product of the conjugate of each first product $S_{I_k}H_{I_k}'$ times another first product, wherein the step of taking the total interfering power $P_I$ as a noise power $\sigma_I^2$ may specifically include: taking the sum of the total interfering power $P_I$ and the total interfering-power increment $P_{S_I,S_{I'}}$ caused by pair-wise correlation at the eNB between each interfering SRS and another interfering SRS as the noise power $\sigma_I^2$.

The disclosure further provides a device for channel estimation, including:

a small-scale-fading-channel generating unit configured to obtain a small-scale fading channel of each carrier of each interfering channel respectively according to a Gaussian distribution;

a total-interfering-power calculating unit configured to calculate a total interfering power $P_I$ of all interfering SRSs according to the obtained small-scale fading channel of each carrier of each interfering channel and a generated large-scale fading gain of each carrier of each interfering channel;

an interference-equivalent-noise generating unit configured to generate an interference-equivalent noise $N_I$ according to the total interfering power $P_I$; and a channel estimating unit configured to perform channel estimation according to a Sounding Reference Signal (SRS) Y received by an Evolved Node B (eNB), the SRS Y being taken as the sum of the interference-equivalent noise $N_I$, a product SH, and a channel noise $N_0$.

In an embodiment, the Gaussian distribution may be CN (0,1).

In an embodiment, the total-interfering-power calculating unit may specifically include:

a channel generating subunit configured to generate a channel of each carrier of each interfering channel by respectively multiplying the obtained small-scale fading channel of each carrier of each interfering channel by the generated large-scale fading gain of each carrier of each interfering channel;

a power calculating subunit configured to calculate a power $$P_{H_{I_k}}$$

of each interfering channel by summing over the respective square of a gain of each carrier of each interfering channel; and a total-interfering-power calculating subunit configured to calculate the total interfering power $P_I$ of all interfering SRSs by summing over the respective product of a transmit power $$P_{S_{I_k}}$$

of each interfering SRS on each carrier times the power $$P_{H_{I_k}}$$

of an interfering channel corresponding to each carrier.

In an embodiment, the total-interfering-power calculating unit may specifically include:

a channel generating subunit configured to generate a channel of each carrier of each interfering channel by multiplying the obtained small-scale fading channel of each carrier of each interfering channel by the generated large-scale fading gain of each carrier of each interfering channel respectively;

an equivalent-interfering-channel generating subunit configured to generate each equivalent interfering channel $H_{I_k}'$ according to the channel of each carrier of each interfering channel; and a total-interfering-power calculating subunit configured to calculating the total interfering power $P_I$ of all interfering SRSs by respectively multiplying each interfering SRS $S_{I_k}$ by an equivalent interfering channel $H_{I_k}$ corresponding to the interfering SRS to obtain a first product, and then summing over a respective product of the first product times the conjugate of the first product.

In an embodiment, the interference-equivalent-noise generating unit may specifically include:

a noise-power generating subunit configured to take the total interfering power $P_I$ of all interfering SRSs as the noise power $\sigma_I^2$; and an interference-equivalent-noise calculating subunit configured to calculate the interference-equivalent noise $N_I$ according to a Gaussian distribution CN $(0,\sigma_I^2)$.

It may be know from the above description that by replacing small-scale fading of an interfering channel with a Gaussian distribution, complexity in simulation may be reduced, thereby improving efficiency in simulation.

DETAILED DESCRIPTION

Figure 1:
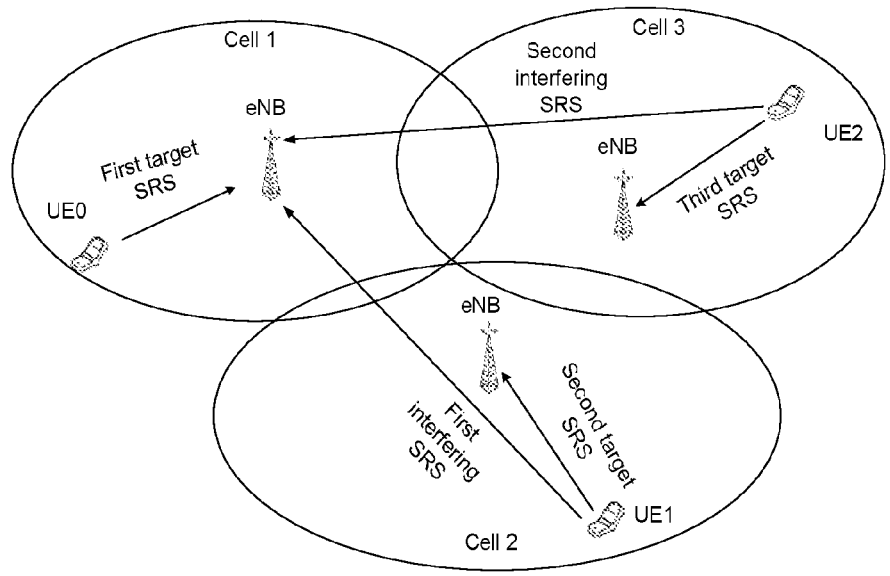
FIG. 1 is a schematic diagram showing interference with a target SRS from a target UE by a same-frequency interfering SRS from an adjacent cell in an LTE system.
Figure 2:
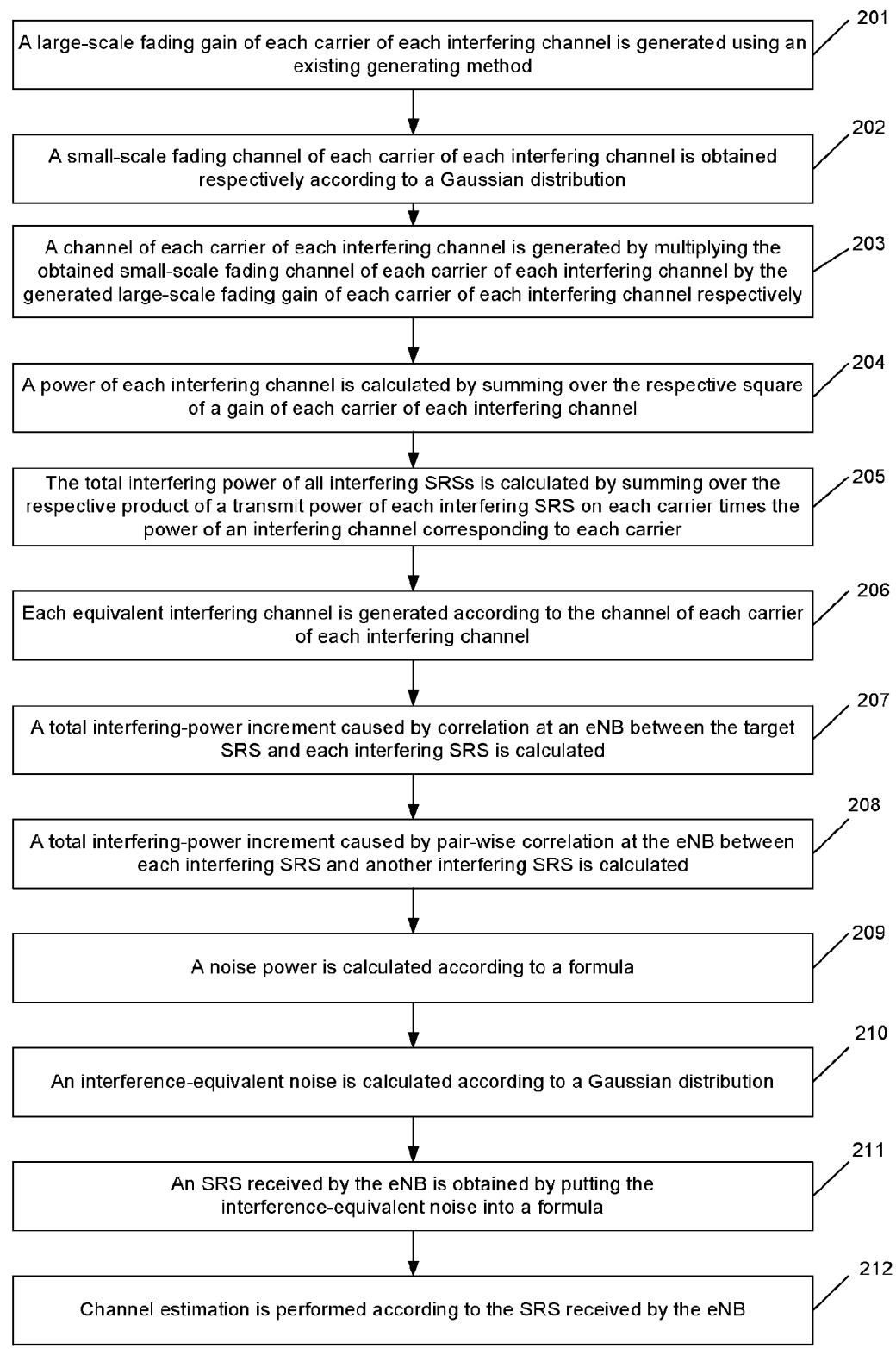
FIG. 2 is a flowchart of Embodiment 1 of a method for channel estimation according to the disclosure.

Embodiment 1 of the disclosure is elaborated below with reference to FIG. 2.

As correlation exists between a target SRS and each interfering SRS and between interfering SRSs, in order to approach a simulated generated channel with a simulated equivalent channel, correlation between the target SRS and an interfering SRS and between interfering SRSs is taken into account in approximation of an interfering SRS received by an eNB in the embodiment. A transmit power $$P_{S_{I_k}}$$

of each interfering SRS on each carrier refers to a power with which an interfering UE transmits an interfering SRS (an interfering channel includes a number of carriers on which the interfering SRS is transmitted). The interfering UE will control the power in transmitting the interfering SRS according to reception by the eNB corresponding to the interfering UE, and makes the transmitted interfering SRS clearer by increasing the power in transmitting the interfering SRS. When no power control is performed by the interfering UE, namely the power in transmitting the interfering SRS is not increased, the transmit power of an interfering SRS on each carrier is equal to 1. In practice, the transmit power $P_{S_{I_k}}$ of each interfering SRS on each carrier may be obtained according to information interaction between each interfering source and a base station. Since there is little difference in the value of the transmit power $P_{S_{I_k}}$ of each interfering SRS on each carrier, the transmit power $P_{S_{I_k}}$ of each interfering SRS on each carrier is set to be the same in the embodiment to facilitate calculation.

Step 201: A large-scale fading gain of each carrier of each interfering channel is generated using an existing generating method.

Step 202: A small-scale fading channel of each carrier of each interfering channel is obtained respectively according to a Gaussian distribution CN (0,1).

It may be obtained by simulation that the small-scale fading channel of each carrier of each interfering channel obtained respectively according to the Gaussian distribution CN (0,1) is substantially the same as a generated small-scale fading channel of each carrier of each interfering channel.

Step 203: A channel of each carrier of each interfering channel is generated by multiplying the obtained small-scale fading channel of each carrier of each interfering channel by the generated large-scale fading gain of each carrier of each interfering channel respectively. The channel of each carrier of each interfering channel includes a gain of each carrier of each interfering channel.

Step 204: A power $P_{H_{I_k}}$ of each interfering channel is calculated by summing over the respective square of a gain of each carrier of each interfering channel.

Step 205: The total interfering power $P_I$ of all interfering SRSs is calculated by summing over the respective product of a transmit power $P_{S_{I_k}}$ of each interfering SRS on each carrier times the power $P_{H_{I_k}}$ of an interfering channel corresponding to each carrier.

Step 206: Each equivalent interfering channel $H_{I_k}'$ is generated according to the channel of each carrier of each interfering channel.

Step 207: A total interfering-power increment $P_{S,S_I}$ caused by correlation at an eNB between the target SRS and each interfering SRS is calculated according to a formula $$P_{S,S_I} = \sum_{k=1}^{K} (SH)^H (S_{I_k} H_{I_k}').$$

Namely, $P_{S,S_I}$ is calculated by multiplying the target SRS S by the target channel H to obtain SH, respectively multiplying each interfering SRS $S_{I_k}$ by an equivalent interfering channel $H_{I_k}'$ corresponding to the interfering SRS to obtain a first product $S_{I_k} H_{I_k}'$, and summing over a respective product of the conjugate of the SH times each first product $S_{I_k} H_{I_k}'$.

Step 208: A total interfering-power increment $P_{S_I,S_{I'}}$ caused by pair-wise correlation at the eNB between each interfering SRS and another interfering SRS is calculated according to a formula $$P_{S_I,S_{I'}} = \sum_{k=1}^{K} \sum_{l=1}^{K} (S_{I_k} H_{I_k}')^H (S_{I_l} H_{I_l}'),$$

wherein k≠l. Namely, $P_{S_I,S_{I'}}$ is calculated by respectively multiplying each interfering SRS $S_{I_k}$ by the equivalent interfering channel $H_{I_k}'$ corresponding to the interfering SRS to obtain a first product $S_{I_k} H_{I_k}'$, and summing over a respective product of the conjugate of each first product $S_{I_k} H_{I_k}'$ times another first product.

Step 209: A noise power $\sigma_I^2$ is calculated according to a formula $\sigma_I^2 = P_I + P_{S,S_I} + P_{S_I,S_{I'}}$. Namely, $\sigma_I^2$ is calculated by summing over the total interfering power $P_I$ of all interfering SRSs, the total interfering-power increment $P_{S,S_I}$ caused by correlation at the eNB between the target SRS and each interfering SRS, and the total interfering-power increment $P_{S_I,S_{I'}}$ caused by pair-wise correlation at the eNB between each interfering SRS and another interfering SRS.

Step 210: An interference-equivalent noise $N_I$ is calculated according to a Gaussian distribution CN $(0,\sigma_I^2)$.

Step 211: An SRS Y received by the eNB is obtained by putting the interference-equivalent noise $N_I$ into a formula $Y = SH + N_I + N_0$.

Step 212: Channel estimation is performed according to the SRS Y received by the eNB.

Figure 3:
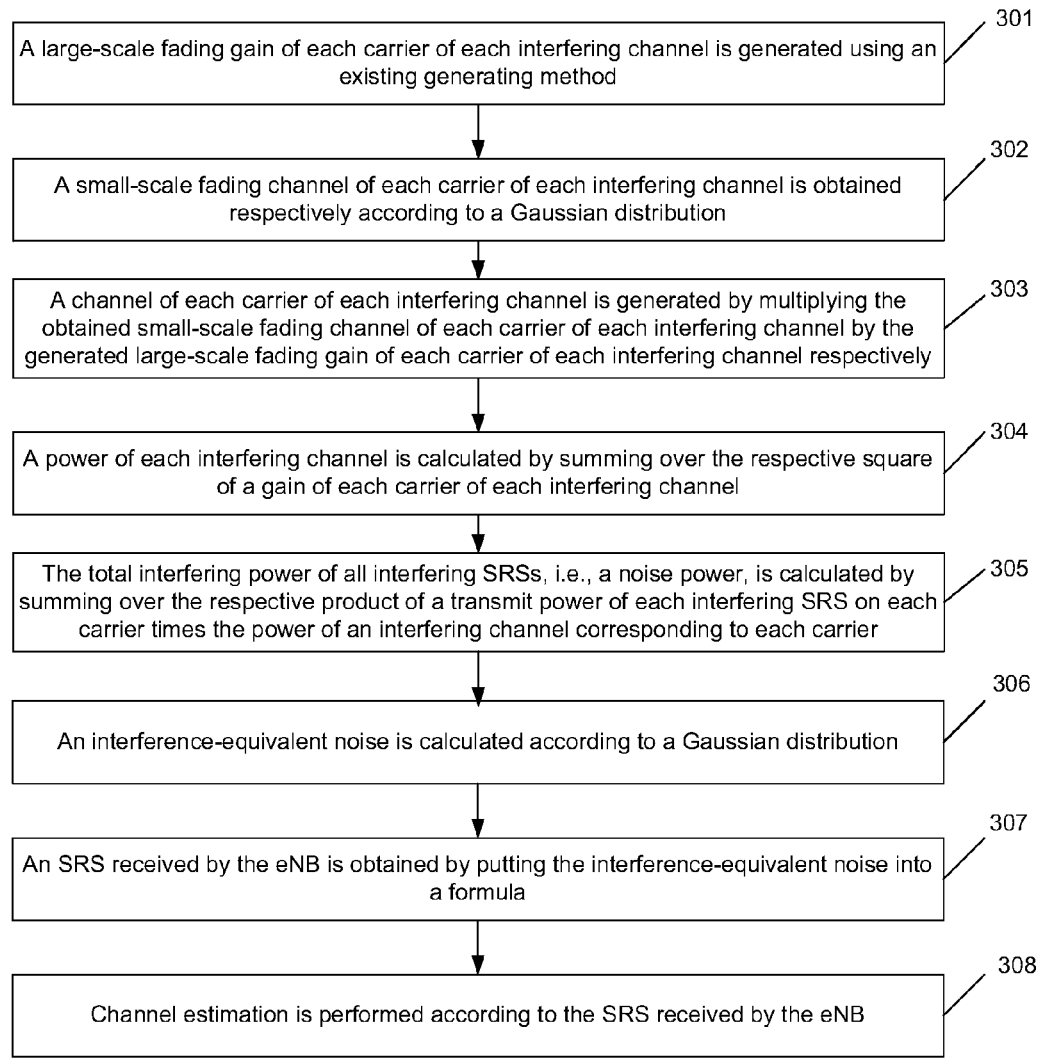
FIG. 3 is a flowchart of Embodiment 2 of the method for channel estimation according to the disclosure.

Embodiment 2 of the disclosure is elaborated below with reference to FIG. 3.

As both the correlation between a target SRS and each interfering SRS and the correlation between interfering SRSs are very small, both the total interfering-power increment $P_{S,S_I}$ caused by correlation at the eNB between the target SRS and each interfering SRS and the total interfering-power increment $P_{S_I,S_{I'}}$ caused by pair-wise correlation at the eNB between each interfering SRS and another interfering SRS are all very small. Therefore, in the embodiment, both the total interfering-power increment $P_{S,S_I}$ caused by correlation at the eNB between the target SRS and each interfering SRS and the total interfering-power increment $P_{S_I,S_{I'}}$ caused by pair-wise correlation at the eNB between each interfering SRS and another interfering SRS are ignored by considering only the total interfering power $P_I$ of all interfering SRSs. In addition, it is assumed in the embodiment that no power control is performed by each interfering UE, namely, the transmit power $$P_{S_{I_k}}$$

of each interfering SRS on each carrier is equal to 1.

Step 301: A large-scale fading gain of each carrier of each interfering channel is generated using an existing generating method.

Step 302: A small-scale fading channel of each carrier of each interfering channel is obtained respectively according to a Gaussian distribution CN (0,1).

Step 303: A channel of each carrier of each interfering channel is generated by multiplying the obtained small-scale fading channel of each carrier of each interfering channel by the generated large-scale fading gain of each carrier of each interfering channel respectively.

Step 304: A power $$P_{H_{I_k}}$$

of each interfering channel is calculated by summing over the respective square of a gain of each carrier of each interfering channel.

Step 305: According to a formula $$P_I = \sum_{k=1}^{K} P_{S_{I_k}} P_{H_{I_k}},$$

the total interfering power $P_I$ of all interfering SRSs is calculated by summing over the respective product of a transmit power $$P_{S_{I_k}}$$

of each interfering SFS on each carrier times the power $$P_{H_{I_k}}$$

of an interfering channel corresponding to each carrier. According to a formula $\sigma_I^2 = P_I + P_{S,S_I} + P_{S_I,S_{I'}}$, $P_1$ is equal to the noise power $\sigma_I^2$ as both $P_{S,S_I}$ and $P_{S_I,S_{I'}}$ are ignored.

Step 306: An interference-equivalent noise $N_I$ is calculated according to a Gaussian distribution CN (0, $\sigma_I^2$).

Step 307: An SRS Y received by the eNB is obtained by putting the interference-equivalent noise $N_I$ into a formula $Y = SH + N_I + N_0$.

Step 308: Channel estimation is performed according to the SRS Y received by the eNB.

Figure 4:
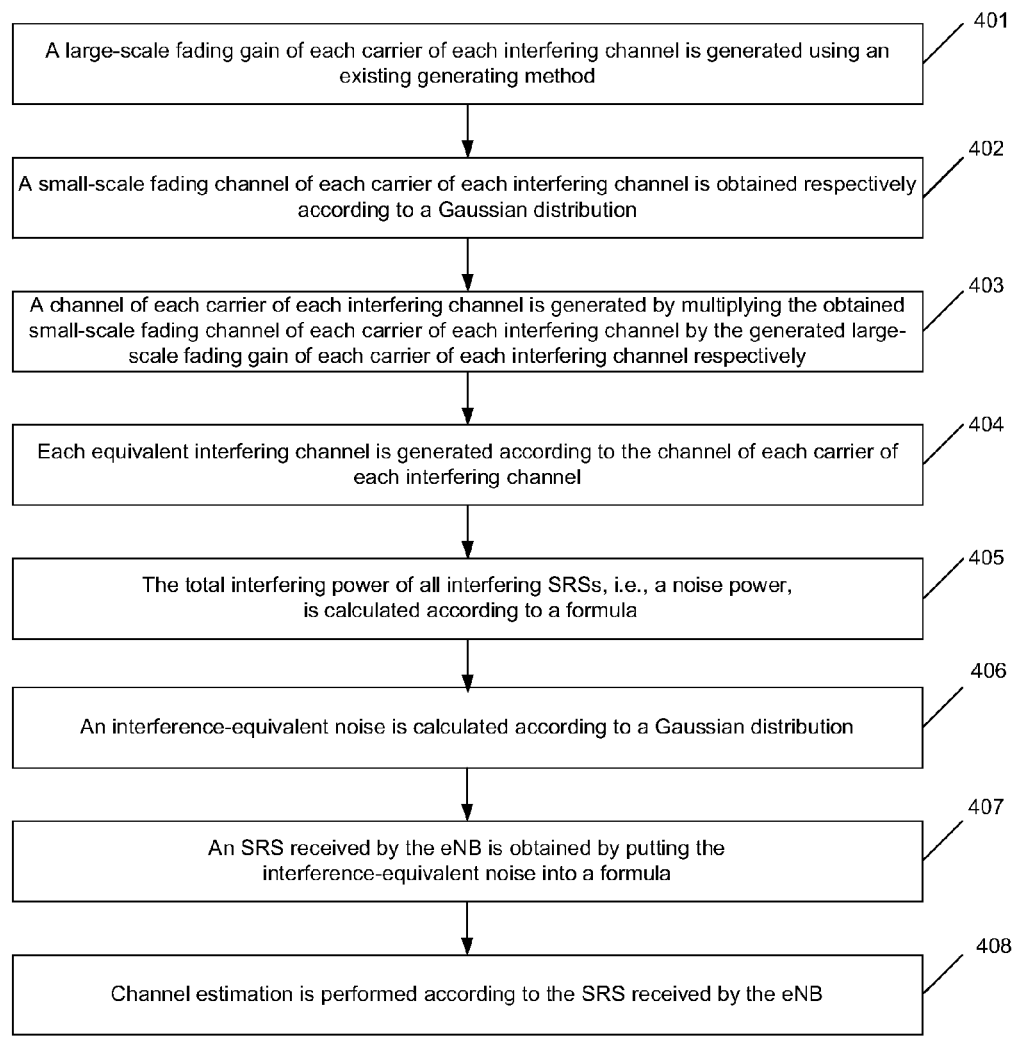
FIG. 4 is a flowchart of Embodiment 3 of the method for channel estimation according to the disclosure.

Embodiment 3 of the disclosure is elaborated below with reference to FIG. 4.

In the embodiment, both the total interfering-power increment $P_{S,S_I}$ caused by correlation at the eNB between the target SRS and each interfering SRS and the total interfering-power increment $P_{S_I,S_{I'}}$ caused by pair-wise correlation at the eNB between each interfering SRS and another interfering SRS are ignored. In addition, it is assumed in the embodiment that the transmit power $$P_{S_{I_k}}$$

of each interfering SRS on each carrier is equal to 1.

Step 401: A large-scale fading gain of each carrier of each interfering channel is generated using an existing generating method.

Step 402: A small-scale fading channel of each carrier of each interfering channel is obtained respectively according to a Gaussian distribution CN (0,1).

Step 403: A channel of each carrier of each interfering channel is generated by multiplying the obtained small-scale fading channel of each carrier of each interfering channel by the generated large-scale fading gain of each carrier of each interfering channel respectively.

Step 404: Each equivalent interfering channel $H_{I_k}'$ is generated according to the channel of each carrier of each interfering channel.

Step 405: The total interfering power $P_I$ of all interfering SRSs is calculated according to a formula $$P_I = \sum_{k=1}^{K} (S_{I_k} H_{I_k}')^H (S_{I_k} H_{I_k}').$$

Namely, $P_I$ is calculated by respectively multiplying each interfering SRS $S_{I_k}$ by an equivalent interfering channel $H_{I_k}'$ corresponding to the interfering SRS to obtain a first product $S_{I_k} H_{I_k}'$, and then summing over a respective product of each first product $S_{I_k} H_{I_k}'$ times the conjugate of the each first product $S_{I_k} H_{I_k}'$. $P_I$ is equal to the noise power $\sigma_I^2$ as both $P_{S,S_I}$ and $P_{S_I,S_{I'}}$ are ignored.

Step 406: An interference-equivalent noise $N_I$ is obtained according to a Gaussian distribution CN (0,$\sigma_I^2$).

Step 407: An SRS Y received by the eNB is obtained by putting the interference-equivalent noise $N_I$ into a formula $Y = SH + N_I + N_0$.

Step 408: Channel estimation is performed according to the SRS Y received by the eNB.

Embodiment 4 of the disclosure is elaborated below.

In the embodiment, neither the total interfering-power increment $P_{S,S_I}$ caused by correlation at the eNB between the target SRS and each interfering SRS nor the total interfering-power increment $P_{S_I,S_{I'}}$ caused by pair-wise correlation at the eNB between each interfering SRS and another interfering SRS is ignored. In addition, it is assumed in the embodiment that the transmit power $$P_{S_{I_k}}$$

of each interfering SRS on each carrier is equal to 1.

Step 501: A large-scale fading gain of each carrier of each interfering channel is generated using an existing generating method.

Step 502: A small-scale fading channel of each carrier of each interfering channel is obtained respectively according to a Gaussian distribution CN (0,1).

Step 503: A channel of each carrier of each interfering channel is generated by multiplying the obtained small-scale fading channel of each carrier of each interfering channel by the generated large-scale fading gain of each carrier of each interfering channel respectively.

Step 504: Each equivalent interfering channel $H_{I_k}'$ is generated according to the channel of each carrier of each interfering channel.

Step 505: The total interfering power $P_I$ of all interfering SRSs is calculated according to a formula $$P_I = \sum_{k=1}^{K} (S_{I_k} H_{I_k}')^H (S_{I_k} H_{I_k}').$$

Namely, $P_I$ is calculated by respectively multiplying each interfering SRS $S_{I_k}$ by an equivalent interfering channel $H_{I_k}$ corresponding to the interfering SRS to obtain a first product, and then summing over a respective product of the first product times the conjugate of the first product.

Step 506: A total interfering-power increment $P_{S,S_I}$ caused by correlation at an eNB between the target SRS and each interfering SRS is calculated according to a formula $$P_{S,S_I} = \sum_{k=1}^{K} (SH)^H (S_{I_k} H_{I_k}').$$

Namely, $P_{S,S_I}$ is calculated by multiplying the target SRS S by the target channel H to obtain SH, respectively multiplying each interfering SRS $S_{I_k}$ by an equivalent interfering channel $H_{I_k}'$ corresponding to the interfering SRS to obtain a first product $S_{I_k} H_{I_k}'$, and summing over a respective product of the conjugate of the SH times each first product $S_{I_k} H_{I_k}'$.

Step 507: A total interfering-power increment $P_{S_I,S_{I'}}$ caused by pair-wise correlation at the eNB between each interfering SRS and another interfering SRS is calculated according to a formula $$P_{S_I,S_I'} = \sum_{k=1}^{K} \sum_{l=1}^{K} (S_{I_k} H_{I_k}')^H (S_{I_l} H_{I_l}'),$$

wherein k≠l. Namely, $P_{S_I,S_{I'}}$ is calculated by respectively multiplying each interfering SRS $S_{I_k}$ by the equivalent interfering channel $H_{I_k}'$ corresponding to the interfering SRS to obtain a first product, and summing over a respective product of the conjugate of each first product times another first product.

Step 508: A noise power $\sigma_I^2$ is calculated according to a formula $\sigma_I^2 = P_I + P_{S,S_I} + P_{S_I,S_{I'}}$. Namely, $\sigma_I^2$ is calculated by summing over the total interfering power $P_I$ of all interfering SRSs, the total interfering-power increment $P_{S,S_I}$ caused by correlation at the eNB between the target SRS and each interfering SRS, and the total interfering-power increment $P_{S_I,S_{I'}}$ caused by pair-wise correlation at the eNB between each interfering SRS and another interfering SRS.

Step 509: An interference-equivalent noise $N_I$ is calculated according to a Gaussian distribution CN (0,$\sigma_I^2$).

Step 510: An SRS Y received by the eNB is obtained by putting the interference-equivalent noise $N_I$ into a formula $Y=SH+N_I+N_0$.

Step 511: Channel estimation is performed according to the SRS Y received by the eNB.

Figure 5:
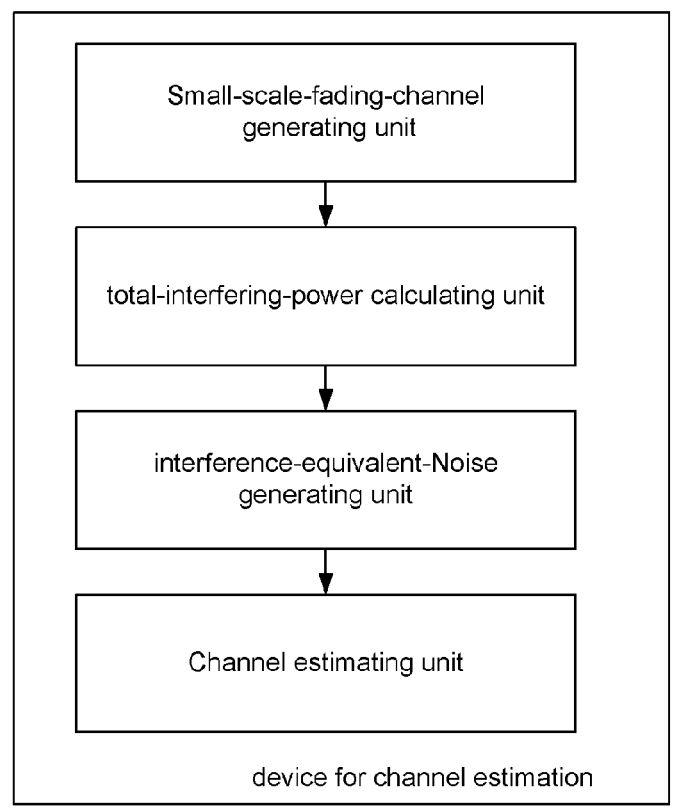
FIG. 5 is a schematic diagram of a structure of a device for channel estimation according to the disclosure.

The disclosure also provides a device for channel estimation. As shown in FIG. 5, the device includes:

a small-scale-fading-channel generating unit configured to obtain a small-scale fading channel of each carrier of each interfering channel respectively according to a Gaussian distribution, wherein the Gaussian distribution is CN (0,1);

a total-interfering-power calculating unit configured to calculate a total interfering power $P_I$ of all interfering SRSs according to the obtained small-scale fading channel of each carrier of each interfering channel and a generated large-scale fading gain of each carrier of each interfering channel;

an interference-equivalent-noise generating unit configured to generate an interference-equivalent noise $N_I$ according to the total interfering power $P_I$; and a channel estimating unit configured to perform channel estimation according to an SRS Y received by an eNB, the SRS Y being taken as the sum of the interference-equivalent noise $N_I$, a product SH, and a channel noise $N_0$, wherein S represents a target SRS transmitted by a target UE, H represents a target channel carrying the target SRS, and $N_0$ represents channel noise.

Figure 6:
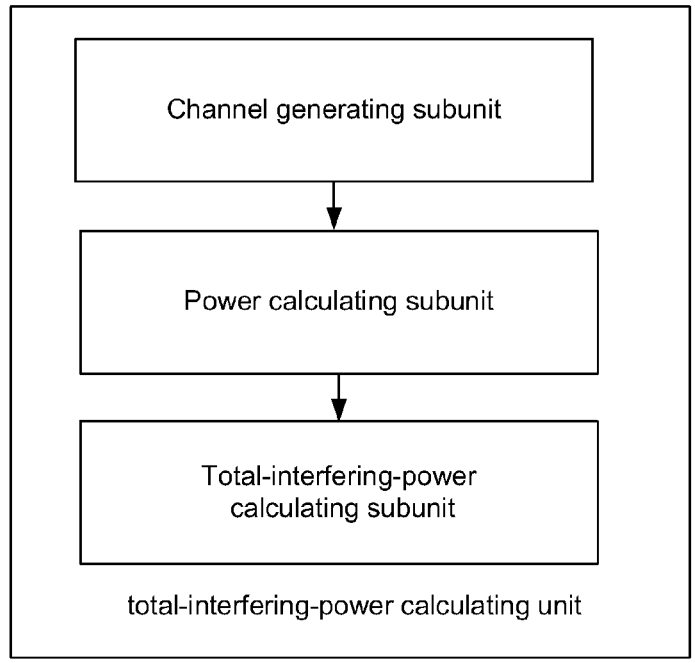
FIG. 6 is a schematic diagram of a structure of an embodiment of a total-interfering-power calculating unit according to the disclosure.

As shown in FIG. 6, the total-interfering-power calculating unit may specifically include:

a channel generating subunit configured to generate a channel of each carrier of each interfering channel by respectively multiplying the obtained small-scale fading channel of each carrier of each interfering channel by the generated large-scale fading gain of each carrier of each interfering channel;

a power calculating subunit configured to calculate a power $$P_{H_{I_k}}$$

of each interfering channel by summing over the respective square of a gain of each carrier of each interfering channel; and a total-interfering-power calculating subunit configured to calculate the total interfering power $P_I$ of all interfering SRSs by summing over the respective product of a transmit power $$P_{H_{I_k}}$$

of each interfering SRS on each carrier times the power $$P_{S_{I_k}}$$

of an interfering channel corresponding to each carrier.

Figure 7:
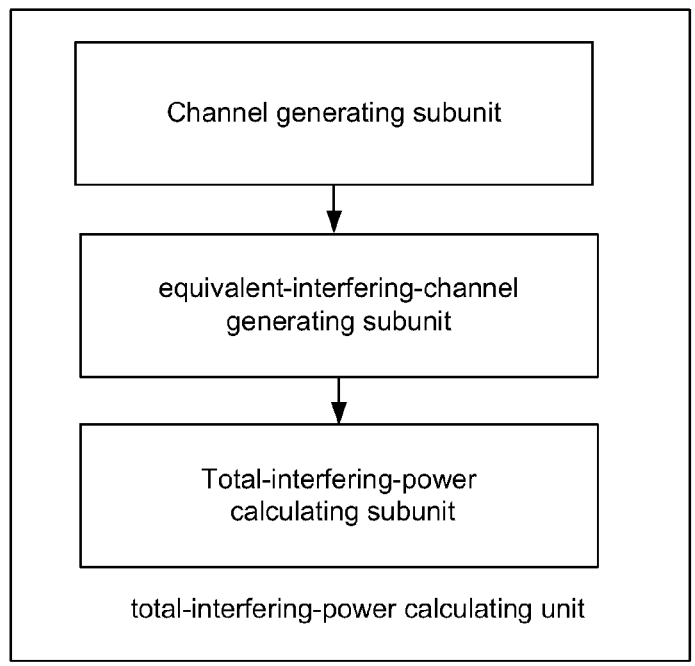
FIG. 7 is a schematic diagram of a structure of another embodiment of the total-interfering-power calculating unit according to the disclosure.

As shown in FIG. 7, the total-interfering-power calculating unit may further include:

a channel generating subunit configured to generate a channel of each carrier of each interfering channel by multiplying the obtained small-scale fading channel of each carrier of each interfering channel by the generated large-scale fading gain of each carrier of each interfering channel respectively;

an equivalent-interfering-channel generating subunit configured to generate each equivalent interfering channel $H_{I_k}'$ according to the channel of each carrier of each interfering channel; and a total-interfering-power calculating subunit configured to calculating the total interfering power $P_I$ of all interfering SRSs by respectively multiplying each interfering SRS $S_{I_k}$ by an equivalent interfering channel $H_{I_k}$ corresponding to the interfering SRS to obtain a first product, and then summing over a respective product of the first product times the conjugate of the first product.

The interference-equivalent-noise generating unit may specifically include:

a noise-power generating subunit configured to take the total interfering power $P_I$ of all interfering SRSs as the noise power $\sigma_I^2$; and an interference-equivalent-noise calculating subunit configured to calculate the interference-equivalent noise $N_I$ according to a Gaussian distribution CN $(0,\sigma_I^2)$.

An effect of the disclosure is further illustrated below through a result of the following simulation.

Simulation parameters are set as follows:

modulating and coding mode: link adaptation antenna configuration: a base station is configured with 4 antennas, and each UE is configured with one antenna channel model: 3GPP case1 2D fading model: considering no path loss and shadow fading number of interfering SRSs: 6

SRS bandwidth: 40 RBs

SRS period: 2 ms

SRS group number: the group number u of a target SRS is 0, and the group number u of an interfering SRS is taken from {1, 2, ... 29}

SRS Cyclic Shift (CS): 0

SRS transmit power: 0 dB/subcarrier, i.e., $$P_{S_{I_k}} = 1$$

Parameters for evaluating the accuracy of channel estimation include Mean Squared Error (MSE) performance of a channel and system-spectral-efficiency performance. Thus, to estimate the impact of approximation of any received interfering SRS as an interference-equivalent noise $N_I$ on the accuracy of channel estimation, it is required to estimate the impact of the approximation on the MSE performance of the channel and on the system-spectral-efficiency performance.

The result of simulation is introduce below taking into account correlation between a target SRS and an interfering SRS as well as that between interfering SRSs.

Impact on the MSE performance of the channel is as follows.

Figure 8:
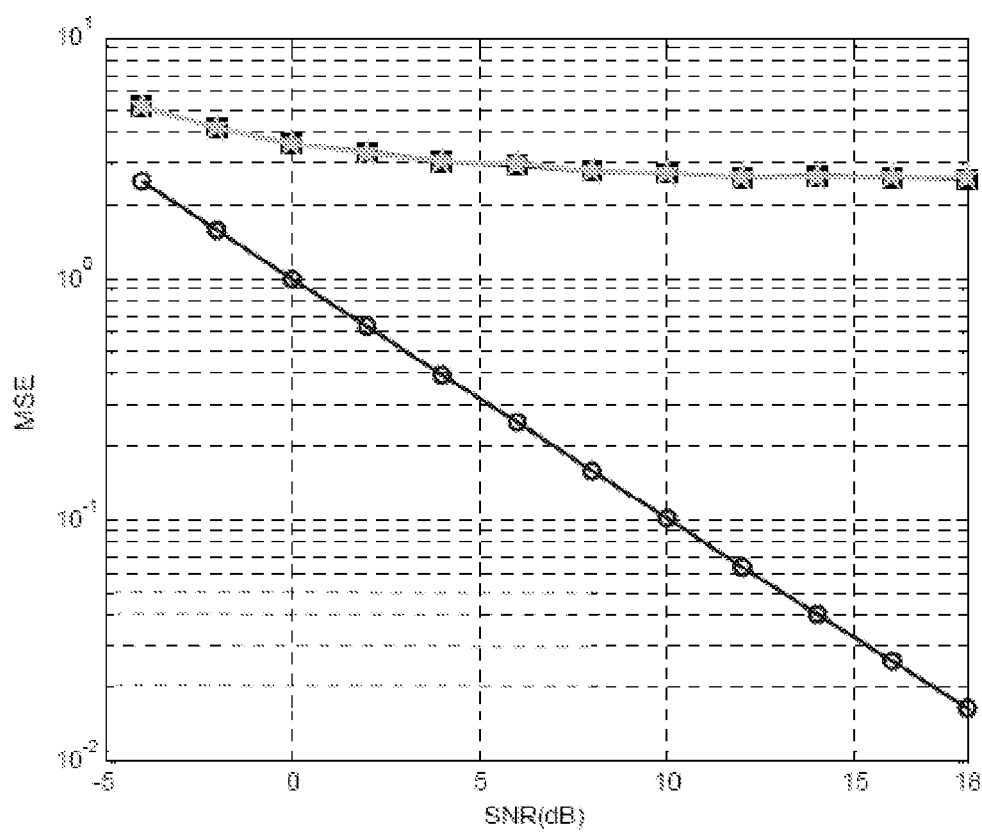
FIG. 8 is an effect diagram of comparison of MSE (Mean Squared Error) performance of a channel taking into account correlation between the target SRS and an interfering SRS and between interfering SRSs.

The MSE performance of the channel is represented by a curve with circles shown in FIG. 8 in the case that a target signal is subjected to interference by just a channel noise $N_0$.

The MSE performance of the channel is represented by a curve with squares shown in FIG. 8 in the case that the target signal is subjected to interference by 6 interfering SRSs and the channel noise $N_0$.

In the case that the target signal is subjected to interference by 6 interfering SRSs and the channel noise $N_0$, and the received interfering SRS is approximated as an interference-equivalent noise $N_I$ according to the disclosure, the MSE performance of the channel is represented by a curve with stars shown in FIG. 8.

As shown in FIG. 8, the curve with stars almost coincides with the curve with squares, which indicates that approximation of the received interfering SRS as an interference-equivalent noise $N_I$ has no impact on the MSE performance of the channel, namely, approximation of the received interfering SRS as an interference-equivalent noise $N_I$ has no impact on the accuracy of channel estimation.

Impact on the system-spectral-efficiency performance is as follows.

Figure 9:
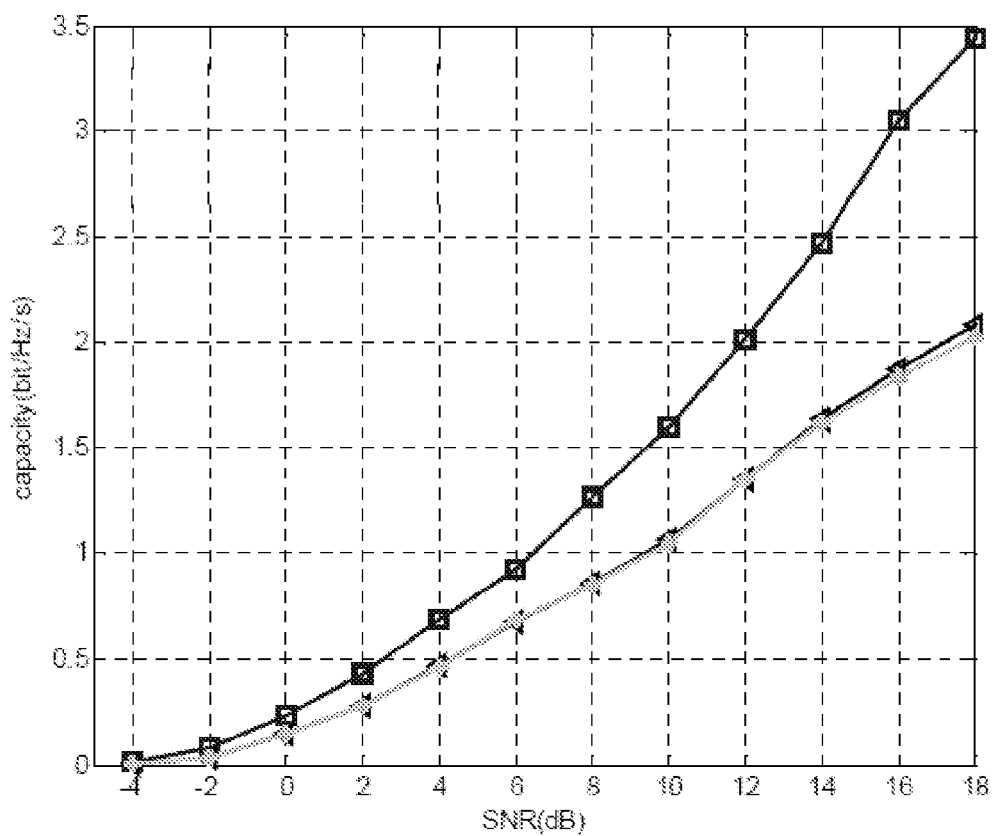
FIG. 9 is an effect diagram of comparison of system-spectral-efficiency performance taking into account correlation between the target SRS and an interfering SRS and between interfering SRSs.

The system-spectral-efficiency performance is represented by a curve with squares shown in FIG. 9 in the case that a target signal is subjected to interference by just a channel noise $N_0$.

The system-spectral-efficiency performance is represented by a curve with triangles shown in FIG. 9 in the case that the target signal is subjected to interference by 6 interfering SRSs and the channel noise $N_0$.

In the case that the target signal is subjected to interference by 6 interfering SRSs and the channel noise $N_0$, and the received interfering SRS is approximated as an interference-equivalent noise $N_I$ according to the disclosure, the MSE performance of the channel is represented by the curve with stars shown in FIG. 9.

As shown in FIG. 9, the curve with triangles almost coincides with the curve with stars, which indicates that approximation of the received interfering SRS as an interference-equivalent noise $N_I$ has no impact on the system-spectral-efficiency performance, namely, approximation of the received interfering SRS as an interference-equivalent noise $N_I$ has no impact on the accuracy of channel estimation.

The result of simulation is introduce below considering no correlation between a target SRS and an interfering SRS and no correlation between interfering SRSs.

Impact on the MSE performance of the channel is as follows.

Figure 10:
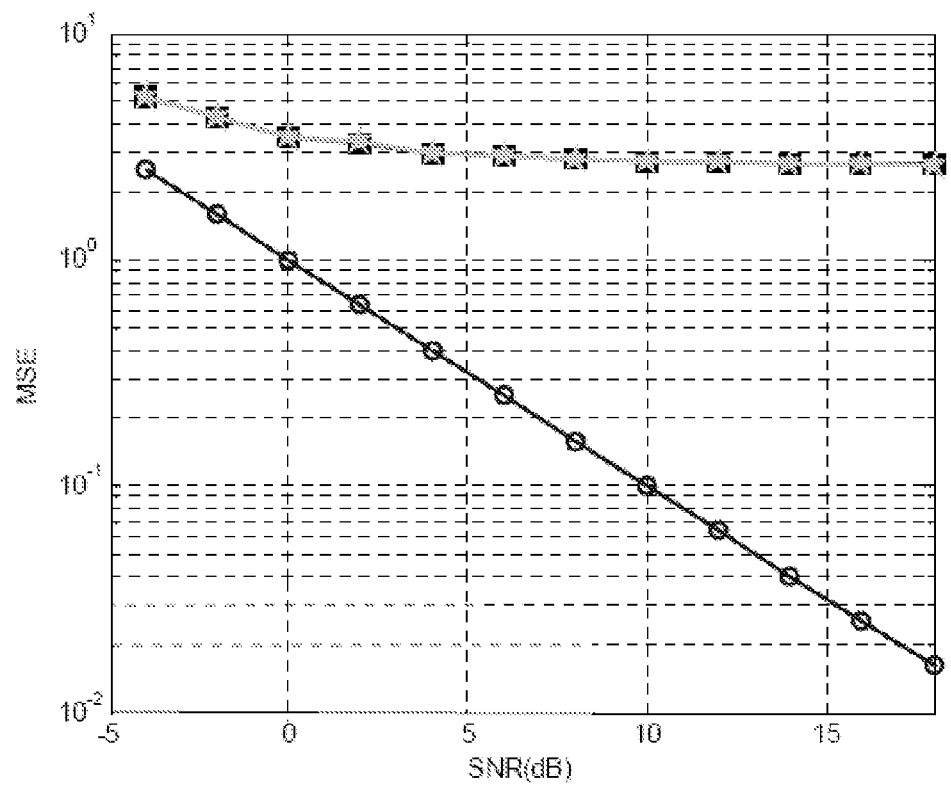
FIG. 10 is an effect diagram of comparison of MSE performance of a channel considering no correlation between the target SRS and an interfering SRS or between interfering SRSs.

The MSE performance of the channel is represented by a curve with circles shown in FIG. 10 in the case that a target signal is subjected to interference by just a channel noise $N_0$.

The MSE performance of the channel is represented by a curve with squares shown in FIG. 10 in the case that the target signal is subjected to interference by 6 interfering SRSs and the channel noise $N_0$.

In the case that the target signal is subjected to interference by 6 interfering SRSs and the channel noise $N_0$, and the received interfering SRS is approximated as an interference-equivalent noise $N_I$ according to the disclosure, the MSE performance of the channel is represented by a curve with stars shown in FIG. 10.

As shown in FIG. 10, the curve with stars almost coincides with the curve with squares, which indicates that approximation of the received interfering SRS as an interference-equivalent noise $N_I$ has no impact on the MSE performance of the channel, namely, approximation of the received interfering SRS as an interference-equivalent noise $N_I$ has no impact on the accuracy of channel estimation.

Impact on the system-spectral-efficiency performance is as follows.

Figure 11:
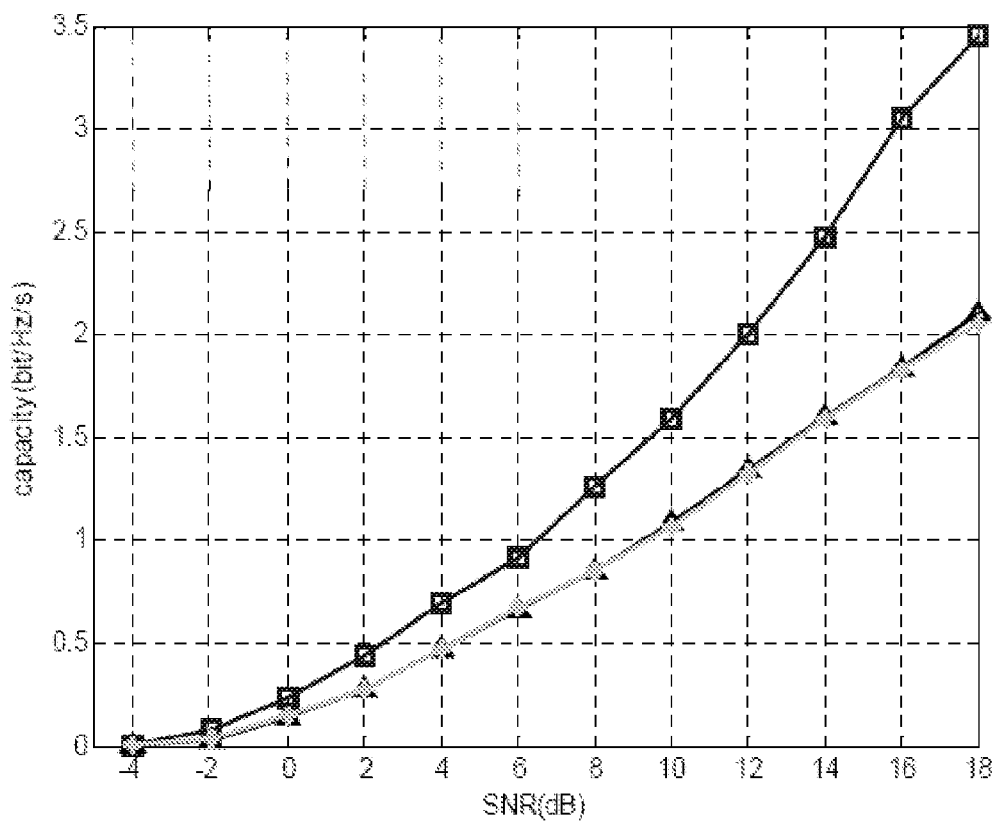
FIG. 11 is an effect diagram of comparison of system-spectral-efficiency performance considering no correlation between the target SRS and an interfering SRS or between interfering SRSs.

The system-spectral-efficiency performance is represented by a curve with squares shown in FIG. 11 in the case that a target signal is subjected to interference by just a channel noise $N_0$.

The system-spectral-efficiency performance is represented by a curve with triangles shown in FIG. 11 in the case that the target signal is subjected to interference by 6 interfering SRSs and the channel noise $N_0$.

In the case that the target signal is subjected to interference by 6 interfering SRSs and the channel noise $N_0$, and the received interfering SRS is approximated as an interference-equivalent noise $N_I$ according to the disclosure, the MSE performance of the channel is represented by the curve with stars shown in FIG. 11.

As shown in FIG. 11, the curve with triangles almost coincides with the curve with stars, which indicates that approximation of the received interfering SRS as an interference-equivalent noise $N_I$ has no impact on the system-spectral-efficiency performance, namely, approximation of the received interfering SRS as an interference-equivalent noise $N_I$ has no impact on the accuracy of channel estimation.

In conclusion, approximation of the interference-equivalent noise $N_I$ as the received interfering SRS using the method of the disclosure is feasible. By replacing small-scale fading of an interfering channel with a Gaussian distribution, complexity in simulation may be reduced, thereby improving efficiency in simulation.

What described are preferred embodiments of the disclosure, and are not intended to limit the scope of the disclosure.

The invention claimed is:

1. A method for channel estimation, comprising:
obtaining a small-scale fading channel of each carrier of each interfering channel respectively according to a Gaussian distribution;
calculating a total interfering power $P_I$ of all interfering Sounding Reference Signals SRSs according to the obtained small-scale fading channel of each carrier of each interfering channel and a generated large-scale fading gain of each carrier of each interfering channel;
calculating an interference-equivalent noise $N_I$ according to the total interfering power $P_I$; and
performing channel estimation according to a SRS Y received by an Evolved Node B (eNB), the SRS Y being taken as the sum of the interference equivalent noise $N_I$, a product SH, and a channel noise $N_0$, wherein S represents a target SRS transmitted by a UE, and H represents a target channel carrying the target SRS.

2. The method according to claim 1, wherein the Gaussian distribution is CN (0,1).

3. The method according to claim 1, wherein the step of calculating a total interfering power $P_I$ of all interfering SRSs comprises:
generating a channel of each carrier of each interfering channel by multiplying the obtained small-scale fading channel of each carrier of each interfering channel by the generated large-scale fading gain of each carrier of each interfering channel respectively;
calculating a power $$P_{H_{I_k}}$$

of each interfering channel by summing over the respective square of a gain of each carrier of each interfering channel; and
calculating the total interfering power $P_I$ of all interfering SRSs by summing over the respective product of a transmit power $$P_{S_{I_k}}$$

of each interfering SRS on each carrier times the power $$P_{H_{I_k}}$$

of an interfering channel corresponding to each carrier.

4. The method according to claim 1, wherein the step of calculating a total interfering power $P_I$ of all interfering SRSs comprises:
generating a channel of each carrier of each interfering channel by multiplying the obtained small-scale fading channel of each carrier of each interfering channel by the generated large-scale fading gain of each carrier of each interfering channel respectively;
generating each equivalent interfering channel $H_{I_k}'$ according to the channel of each carrier of each interfering channel; and
calculating the total interfering power $P_I$ of all interfering SRSs by respectively multiplying each interfering SRS $S_{I_k}$ by an equivalent interfering channel $H_{I_k}'$ corresponding to the interfering SRS to obtain a first product $S_{I_k}H_{I_k}'$, and then summing over a respective product of each first product $S_{I_k}H_{I_k}'$ times the conjugate of the each first product $S_{I_k}H_{I_k}'$.

5. The method according to claim 1, wherein the step of calculating an interference-equivalent noise $N_I$ according to the total interfering power $P_I$ comprises:
taking the total interfering power $P_I$ as a noise power $\sigma_I^2$; and
calculating the interference-equivalent noise $N_I$ according to a Gaussian distribution GN $(0,\sigma_I^2)$.

6. The method according to claim 5, further comprising: before the taking the total interfering power $P_I$ as a noise power $\sigma_I^2$,
generating each equivalent interfering channel $H_{I_k}'$ according to the channel of each carrier of each interfering channel; and
calculating a total interfering-power increment $P_{S,S_I}$ caused by correlation at the eNB between the target SRS and each interfering SRS by multiplying the target SRS S by the target channel H to obtain SH, respectively multiplying each interfering SRS $S_{I_k}$ by an equivalent interfering channel $H_{I_k}'$ corresponding to the interfering SRS to obtain a first product $S_{I_k}H_{I_k}'$, and summing over a respective product of the conjugate of the SH times each first product $S_{I_k}H_{I_k}'$,
wherein the step of taking the total interfering power $P_I$ as a noise power $\sigma_I^2$ comprises: taking the sum of the total interfering power $P_I$ and the total interfering-power increment $P_{S,S_I}$ caused by correlation at the eNB between the target SRS and each interfering SRS as the noise power $\sigma_I^2$.

7. The method according to claim 6, further comprising: after generating each equivalent interfering channel $H_{I_k}'$ according to the channel of each carrier of each interfering channel,
calculating a total interfering-power increment $P_{S_I,S_{I'}}$ caused by pair-wise correlation at the eNB between each interfering SRS and another interfering SRS by respectively multiplying each interfering SRS $S_{I_k}$ by the equivalent interfering channel $H_{I_k}'$ corresponding to the interfering SRS to obtain a first product $S_{I_k}H_{I_k}'$, and summing over a respective product of the conjugate of each first product $S_{I_k}H_{I_k}'$ times another first product,
wherein the step of taking the total interfering power $P_I$ as a noise power $\sigma_I^2$ comprises: taking the sum of the total interfering power $P_I$, the total interfering-power increment $P_{S,S_I}$ caused by correlation at the eNB between the target SRS and each interfering SRS, and the total interfering-power increment $P_{S_I,S_{I'}}$ caused by pair-wise correlation at the eNB between each interfering SRS and another interfering SRS as the noise power $\sigma_I^2$.

8. The method according to claim 5, further comprising: before the taking the total interfering power $P_I$ as a noise power $\sigma_I^2$,
  generating each equivalent interfering channel $H_{I_k}'$ according to the channel of each carrier of each interfering channel; and
  calculating a total interfering-power increment $P_{S_I,S_{I'}}$ caused by pair-wise correlation at the eNB between each interfering SRS and another interfering SRS by respectively multiplying each interfering SRS $S_{I_k}$ by the equivalent interfering channel $H_{I_k}'$ corresponding to the interfering SRS to obtain a first product $S_{I_k}H_{I_k}'$, and summing over a respective product of the conjugate of each first product $S_{I_k}H_{I_k}'$ times another first product,
wherein the step of taking the total interfering power $P_I$ as a noise power $\sigma_I^2$ comprises: taking the sum of the total interfering power $P_I$ and the total interfering-power increment $P_{S_I,S_{I'}}$ caused by pair-wise correlation at the eNB between each interfering SRS and another interfering SRS as the noise power $\sigma_I^2$.

9. A device for channel estimation, comprising:
  a small-scale-fading-channel generating unit configured to obtain a small-scale fading channel of each carrier of each interfering channel respectively according to a Gaussian distribution;
  a total-interfering-power calculating unit configured to calculate a total interfering power $P_I$ of all interfering Sounding Reference Signals (SRSs) according to the obtained small-scale fading channel of each carrier of each interfering channel and a generated large-scale fading gain of each carrier of each interfering channel;
  an interference-equivalent-noise generating unit configured to generate an interference-equivalent noise $N_0$ according to the total interfering power $P_I$; and
  a channel estimating unit configured to perform channel estimation according to a (SRS) Y received by an Evolved Node B (eNB), the SRS Y being taken as the sum of the interference-equivalent noise $N_I$, a product SH, and a channel noise $N_0$, wherein S represents a target SRS transmitted by a UE, and H represents a target channel carrying the target SRS.

10. The device according to claim 9, wherein the Gaussian distribution is CN (0,1).

11. The device according to claim 9, wherein the total-interfering-power calculating unit further comprises:
  a channel generating subunit configured to generate a channel of each carrier of each interfering channel by respectively multiplying the obtained small-scale fading channel of each carrier of each interfering channel by the generated large-scale fading gain of each carrier of each interfering channel;
  a power calculating subunit configured to calculate a power $$P_{H_{I_k}}$$

of each interfering channel by summing over the respective square of a gain of each carrier of each interfering channel; and
  a total-interfering-power calculating subunit configured to calculate the total interfering power $P_I$ of all interfering SRSs by summing over the respective product of a transmit power $$P_{S_{I_k}}$$

of each interfering SRS on each carrier times the power $$P_{H_{I_k}}$$

of an interfering channel corresponding to each carrier.

12. The device according to claim 9, wherein the total-interfering-power calculating unit further comprises:
  a channel generating subunit configured to generate a channel of each carrier of each interfering channel by multiplying the obtained small-scale fading channel of each carrier of each interfering channel by the generated large-scale fading gain of each carrier of each interfering channel respectively;
  an equivalent-interfering-channel generating subunit configured to generate each equivalent interfering channel $H_{I_k}'$ according to the channel of each carrier of each interfering channel; and
  a total-interfering-power calculating subunit configured to calculating the total interfering power $P_I$ of all interfering SRSs by respectively multiplying each interfering SRS $S_{I_k}$ by an equivalent interfering channel $H_{I_k}$ corresponding to the interfering SRS to obtain a first product, and then summing over a respective product of the first product times the conjugate of the first product.

13. The device according to claim 9, wherein the interference-equivalent-noise generating unit further comprises:
  a noise-power generating subunit configured to take the total interfering power $P_I$ of all interfering SRSs as the noise power $\sigma_I^2$; and
  an interference-equivalent-noise calculating subunit configured to calculate the interference-equivalent noise $N_I$ according to a Gaussian distribution CN $(0,\sigma_I^2)$.

* * * * *